United States Patent
Eriksson et al.

(10) Patent No.: US 9,154,429 B2
(45) Date of Patent: Oct. 6, 2015

(54) SYSTEM AND METHOD FOR PROVIDING DIFFERENTIATED SERVICES

(75) Inventors: Anders Eriksson, Kista (SE); Börje Ohlman, Bromma (SE); Wei Zhao, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 2141 days.

(21) Appl. No.: 10/548,187

(22) PCT Filed: Mar. 5, 2004

(86) PCT No.: PCT/SE2004/000310
§ 371 (c)(1), (2), (4) Date: Sep. 7, 2005

(87) PCT Pub. No.: WO2004/080012
PCT Pub. Date: Sep. 16, 2004

(65) Prior Publication Data
US 2006/0182098 A1 Aug. 17, 2006

(30) Foreign Application Priority Data
Mar. 7, 2003 (EP) .................. 03100582

(51) Int. Cl.
H04L 12/801 (2013.01)
H04L 12/851 (2013.01)
G06F 15/16 (2006.01)
H04L 12/853 (2013.01)
H04L 12/891 (2013.01)

(52) U.S. Cl.
CPC ............ *H04L 47/2416* (2013.01); *H04L 47/10* (2013.01); *H04L 47/2408* (2013.01); *H04L 47/2425* (2013.01); *H04L 47/41* (2013.01); *Y02B 60/33* (2013.01)

(58) Field of Classification Search
CPC .......................... H04L 47/10; H04L 47/2408
See application file for complete search history.

(56) References Cited

U.S. PATENT DOCUMENTS 6,822,940 B1 * 11/2004 Zavalkovsky et al. ........ 370/237
7,339,942 B2 * 3/2008 Morgan et al. ................ 370/412

(Continued)

FOREIGN PATENT DOCUMENTS

WO 01/69851 A2 9/2001
WO 02/11461 A2 2/2002

(Continued)

OTHER PUBLICATIONS

Mamais et al., "Efficient Buffer Management and Scheduling in a Combined IntServ and DiffServ Architecture: A Performance Study", Jun. 21, 1999, IEEE International Conference on ATM, XX, XX, pp. 236-242, XP001008733.

(Continued)

*Primary Examiner* — Suraj Joshi
(74) *Attorney, Agent, or Firm* — Nixon & Vanderhye, P.C.

(57) ABSTRACT

The present invention relates to a method and arrangements for updating the mapping of traffic in the form of a set of service level aggregate flows (SLS1, SLSM) to a set of partial resources (B1, BN) for forwarding the traffic in a communications network (21). Each service level aggregate flow corresponds to a service level associated with a set of service requirements. Information regarding traffic characteristics of each service level aggregate flow and performance of the set of network resources are obtained. Based on this information, the mapping of the set of service level aggregate flows to the set of network resources is updated to achieve a more efficient utilization of the set of network resources, while fulfilling the set of service requirements.

28 Claims, 3 Drawing Sheets

(56) References Cited

U.S. PATENT DOCUMENTS

2003/0076849 A1* 4/2003 Morgan et al. ............... 370/412
2004/0107281 A1* 6/2004 Bose et al. .................... 709/226
2004/0136379 A1* 7/2004 Liao et al. ................. 370/395.21

FOREIGN PATENT DOCUMENTS

WO 02/25867 A2 3/2002
WO 02/080013 A1 10/2002

OTHER PUBLICATIONS

Goderis et al., "Towards an Integrated Solution for Multimedia over IP", Apr. 1, 2001, Electrical Communication, Alcatel, pp. 97-104, XP001065319.

International Search Report of PCT/SE2004/000310, mailed 77 Jul. 2004.

* cited by examiner

SYSTEM AND METHOD FOR PROVIDING DIFFERENTIATED SERVICES

This application is the US national phase of international application PCT/SE2004/000310, filed 5 Mar. 2004, which designated the U.S. and claims priority of EP 03100582.0, dated 7 Mar. 2003, the entire contents of each of which are hereby incorporated by reference.

TECHNICAL FIELD

The disclosed technology relates to communications systems and methods, and more particularly, to systems and methods for providing differentiated services to flows of telecommunications traffic in a resource efficient manner.

BACKGROUND

The Internet is a packet based network transporting many different types of telecommunications traffic, such as voice, data, and multimedia traffic, which originates from a large variety of applications. Different types of traffic have different quality of service (QoS) demands. For voice traffic a small and uniform packet delay is particularly important, while small packet loss is the most important requirement for data traffic. Furthermore, service providers are interested in offering services with different QoS that allow them to satisfy the varying needs of their customers and to maintain a differentiated pricing scheme. Therefore several mechanisms for providing different QoS to different users and traffic flows in packet based networks such as the Internet have been developed.

The international patent application WO02/25867 describes a radio access network that provides different priority classes to different packet data connections with a user equipment. The priority class of a data connection may be dynamically adjusted by a control node in accordance with a throughput criterion which is communicated to the control node by the user equipment.

The IETF (Internet Engineering Task Force) has developed the Integrated Services (IntServ) architecture which is described in IETF RFC 1633. The IntServ architecture uses an explicit mechanism to signal per-flow QoS requirements to network elements such as hosts and routers. There are a number of drawbacks associated with IntServ. IntServ requires maintenance and control of per-flow states and classification. Network resources are reserved on a per-flow basis which introduces scalability problems at the core networks where the number of processed flows often is in the range of millions. Therefore it is only practical to use the IntServ architecture in small access networks where the number of flows is modest.

To overcome the scalability and complexity problems of IntServ the IETF introduced the Differentiated Services (DiffServ) architecture, described in IETF RFC 2475. Traffic through network core routers implementing DiffServ is treated on an aggregate basis. Traffic entering a network is classified and assigned to different behaviour aggregates. Each behaviour aggregate is identified by a single DS (Differentiated Services) codepoint. When the traffic is classified packets are marked with a particular DS codepoint which is placed in a DS field in the IP (Internet Protocol) header. Within the core of the network, a packet is forwarded according to a per-hop behaviour (PHB) associated with the DS codepoint of the packet. A PHB determines the externally observable forwarding behaviour (such as forwarding delay and packet loss) of a node at different load levels. PHBs are logical network resources that govern the use of underlying physical network resources. Thus a PHB can be seen as a partial network resource, which defines a subset of a total network resource.

The international patent application WO02/11461 is one example of a document that describes a DiffServ system. It discloses a method and arrangement for providing dynamic quality of service by means of a bandwidth broker in an IP Network that includes a DiffServ architecture. The bandwidth broker may obtain resource availability information by communication only with border routers of a DiffServ domain.

Another example of a document that discusses a DiffServ implementation is the international patent application WO02/080013, which describes dynamic resource allocation that provide differentiated services over a broadband communication network that includes a satellite.

When a service provider sells a bearer service to an end user the service is usually specified. The service may be specified by a Service Level Specification (SLS) that includes QoS requirements for the service. Thus SLSs may be used to define different classes or levels of service. In order to fulfil the QoS requirements of the SLS the allocation of resources assigned to the traffic associated with the SLS is crucial. Today the mapping of SLSs to network resources is usually made semi-permanently as part of the provisioning and configuration of a network, see IETF RFC 3086. The mapping is set up to suit an expected mix of traffic.

In traditional networks, the traffic characteristics are fairly well known. In future multi-service networks and multi-access networks, traffic characteristics will be dynamic due to changes in user behaviour, introduction of new applications, etc. Moreover, these changes imply that the network must be flexible in terms of resource allocation to different QoS classes. New techniques for managing networks efficiently will therefore be needed.

SUMMARY

As mentioned above networks of today are dimensioned according to a certain expected traffic mix. The network elements and mechanisms are then statically configured via management interfaces. If the traffic mix changes a substantial effort is needed to reconfigure the network. This will often be more costly than to let the network operate with a suboptimal configuration. In networks with highly dynamic traffic mixes it would thus be possible to improve network resource utilization considerably if mappings of service levels to network resources could be changed easier and on a timescale that is much shorter than what is common today.

An object of one or more aspects of the present invention is thus to provide arrangements and a method that allows for dynamic mapping of service levels to network resources such that efficient resource utilization may be achieved even when the traffic mix varies.

The arrangements and methods according to an aspect of the present invention makes it possible to dynamically and automatically change the mapping of traffic to partial resources based on information about the actual traffic mix currently being transported in the network. The mapping is adapted to the traffic mix to obtain a mapping that achieves a more efficient utilization of resources in total when forwarding the traffic mix, while fulfilling the service requirements that have been set up. The optimal mapping is usually considered to be the mapping that minimizes the amount of wasted resources, i.e. resources that is not used for forwarding the traffic mix but which is reserved in such a way that it cannot be used for transporting other traffic.

According to a first aspect of the present invention a system is provided for forwarding telecommunication traffic of a number of microflows in a quality of service enabled telecommunications network. Each microflow is allocated a service level from a set of predetermined service levels to create a set of service level aggregate flows and each service level is associated with a set of service requirements. The system comprises a set of partial resources for forwarding the traffic in the network, to which resources the service level aggregate flows are mapped. The system further comprises a control unit arranged to receive information regarding traffic characteristics of each service level aggregate flow and resource performance and to update the mapping of the service level aggregate flows to the set of partial resources, based on the received information, to obtain an updated mapping that reduces the total amount of wasted resources, while fulfilling the service requirements of the service levels.

According to a second aspect of the present invention a method is provided for updating a mapping of service level aggregate flows to a set of partial resources for forwarding traffic in a quality of service enabled telecommunications network. The method comprises the step of receiving a set of service level aggregate flows. Each service level aggregate flow is made up of microflows that have been allocated the same service level from a set of predetermined service levels and each service level is associated with a set of service requirements. The method also comprises the step of obtaining information regarding traffic characteristics of each service level aggregate flow and resource performance, and the step of updating the mapping of the service level aggregate flows to the set of partial resources, based on the obtained information, to obtain an updated mapping that reduces the total amount of wasted resources, while fulfilling the service requirements of the service levels.

According to a third aspect of the present invention a control unit is provided for controlling the mapping of service level aggregate flows of telecommunications traffic to a set of partial resources for forwarding traffic in a network. Each service level aggregate flow corresponds to a service level associated with a set of service requirements. The control unit comprises means for receiving information regarding traffic characteristics of each service level aggregate flow and the performance of the set of partial resources. Furthermore the control unit comprises means for dynamically controlling the mapping of the service level aggregate flows to the set of partial resources, based on the received information, to obtain an updated mapping that reduces the total amount of wasted resources, while fulfilling the service requirements of the service levels.

According to an example embodiment of the invention resource parameters that govern the performance of the partial resources are updated in view of the current traffic mix to achieve the combination of resource parameters and mapping that gives the most efficient utilization of the partial resources, which is the mapping that minimizes the total amount of wasted resources and still fulfils the service requirements of the service levels.

To optimize the utilization of resources of a network with several service levels, the mapping of different service levels on the available network resources are adapted to the current traffic mix in a dynamic fashion. One or more embodiments enable a network operator to perform adaptive mapping in a dynamic fashion, as opposed to the semi-permanent configuration of this mapping that is done in state of the art products.

A semi-permanently performed mapping, as in the prior art solutions, may become inefficient if the traffic mix changes. The fact that the mapping is inefficient may not be detected and even if it is detected it is often cumbersome to change the semi-permanently performed mapping.

In contrast one or more embodiments of the present invention advantageously allow for continuous supervision of the current traffic mix and corresponding adaptation of the mapping. Thus, the mapping may be adapted quickly and automatically when the traffic mix changes.

The embodiment(s) of the present invention makes it possible for a network operator to utilize his network resources more efficiently. Thereby the operator may be able to forward more traffic, provide better quality of service or reduce the amount of network recourses.

Since the embodiment(s) allow for continuous supervision of the current traffic mix and dynamic optimization of the mapping of service levels to network resources, the embodiment(s) can also make it easier for a network operator to ascertain that the service requirements of different service levels are fulfilled and that no network resources are overloaded without having to provide overcapacity of network resources.

Further advantages and objects of embodiments of the present invention will become apparent when reading the following detailed description in conjunction with the drawings.

DETAILED DESCRIPTION

Figure 1:
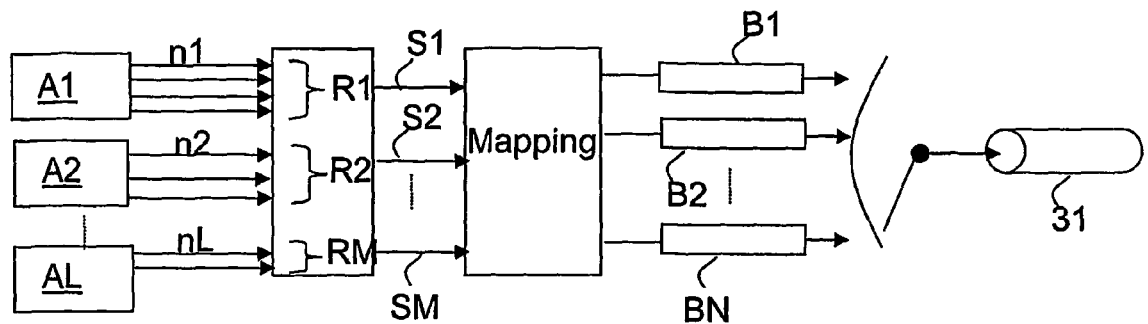
FIG. 1 is a schematic block diagram illustrating a system wherein the embodiment(s) of the present invention may be used.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

According to the embodiment(s) of the present invention mappings of service levels to resources are changed dynamically and automatically, based on feedback or signalling information giving information regarding the actual traffic mix currently being transported in the network. The embodiment(s) may for instance be used for mapping UMTS bearer services onto DiffServ PHBs.

The embodiment(s) are based on dynamic optimization of mapping and will be explained in general by means of an illustration in FIG. 1. FIG. 1 illustrates a number of packet flows being multiplexed on the same physical link 31. The flows may be generated by for example telephony, video conferencing, streaming, and interactive applications. Therefore the flows have different requirements on bandwidth, transport delay and packet loss rate. Thus it is advantageous to treat the flows according to different service levels and to classify the traffic accordingly. Flows having the same or similar QoS requirements are allocated the same service level and are treated as an aggregate traffic flow in order to reduce complexity.

Assume that each packet flow has well defined requirements on bandwidth, delay and packet loss. In FIG. 1, the telephony application is denoted A1, the video conferencing application is denoted A2, etc. The traffic mix to be transported on the physical link 31 is made up of n1 flows from application A1, n2 flows from application A2, etc. The flows from application A1 are allocated a first service level having QoS requirements R1 and form a service level aggregate flow S1, similarly the flows from application A2 are allocated a second service level having QoS requirements R2 and form a service level aggregate flow S2 etc. However note that flows from different applications may be combined into a single aggregate flow if this is appropriate in view of the QoS requirements of the flows.

To govern the admission of traffic onto the physical link a number of buffers B1, B2 . . . BN are set up. Each buffer is allocated a part of the bandwidth that is available on the physical link. Thus, the buffers represent a set of partial resources on which the traffic is to be distributed. A mapping rule determines the mapping between the aggregate flows S1, S2 . . . SM and the partial resources B1, B2 . . . BN. Moreover a given multiplexing rule determines the scheduling of the transmission on the link 31 of the packets belonging to each partial resource. The scheduling ascertains that the delay and loss targets for each flow are fulfilled.

In order to achieve as efficient utilization of resources as possible it is desirable to make sure that the traffic transporting capabilities of the partial resources can be used to their fullest extent. This implies that traffic flows should be fed to the partial resources such that as much traffic as possible can be transported by the partial resources. If the traffic transporting capability of a partial resource is not utilized as much as it could be in view of the current traffic mix, the part of the partial resource that is not used for transporting traffic is a wasted resource. The term "wasted resources" is in this specification defined as resources that are not used for transporting a given traffic mix but which are still reserved such that they are not available for transporting other traffic. The meaning of wasted resources will be explained further below in connection with the accompanying drawings.

The optimal mapping could be defined as follows:

For a given traffic mix consisting of the aggregate flows S1 . . . SM, and for a given set of partial resources B1 . . . BN, the optimal mapping minimizes the wasted resources when transporting the traffic mix such that the requirements R1 . . . RM are fulfilled.

The network operator may choose an alternative definition of the optimal mapping, but usually the operator is interested in minimizing the amount of wasted resources that arise when transporting a given amount of traffic while fulfilling QoS requirements associated with the traffic. Thereby the operator may be able to make some resources available for transporting additional traffic.

If it is possible to vary parameters that are associated with the partial resources and that have an impact on the performance of the partial resources an even better utilization of partial resources could be obtained by determining the combination of mapping and resource parameters that minimizes the wasted resources while fulfilling the service level QoS requirements. Resource parameters that govern the performance of the partial resources may for instance be the parameters such as buffer size and priorities assigned to different partial resources. Such parameters can affect the portion of an underlying physical resource that is allocated to the partial resource. The choice of mechanism for scheduling the access of the partial resources to a physical link also affects the performance of the partial resources. The resource parameters may have an impact on the performance of the partial resources in such a way that they affect the packet delay and packet loss of the partial resources at different load levels. The ability to adapt the partial resources makes it possible to minimize the total amount of network resources that is allocated for transporting a given set of aggregate traffic flows.

Stated in the above-mentioned manner, there is a direct translation between the mapping and scheduling rules and the cost of transporting the traffic mix. The optimal mapping is thus the mapping that minimizes the bandwidth cost.

Different traffic mixes will have different optimal mapping and scheduling rules. This implies that the operator could reduce the cost by changing the mapping or by changing both the mapping and scheduling rules dynamically as the traffic mix changes on a given link.

Note that the above definition of the optimal mapping as the mapping that minimizes the bandwidth cost corresponds to the definition of the optimal mapping as the mapping that maximizes the operator's income.

Figure 2:
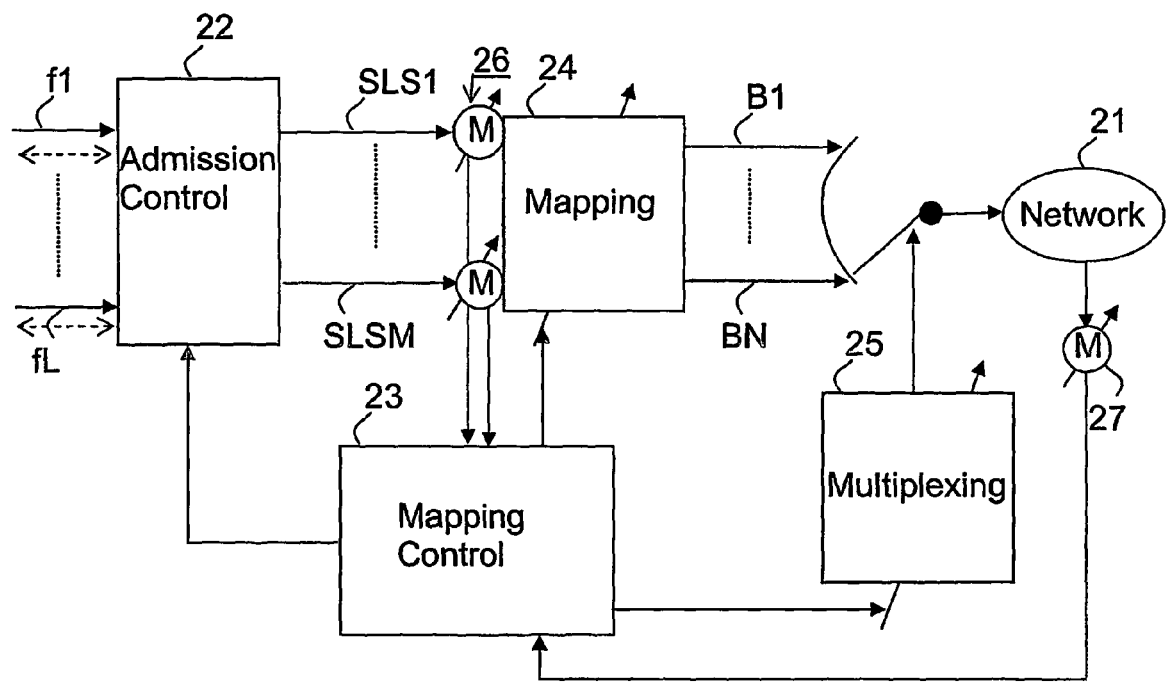
FIG. 2 is a schematic block diagram illustrating an embodiment of a mechanism for dynamic mapping between aggregate flows and partial resources according to the present invention.

FIG. 2 is a block diagram that illustrates an embodiment of a mechanism for performing the dynamic optimization of the mapping and the scheduling rules according to the present invention. FIG. 2 shows L microflows f1, f2, . . . , fL that arrives at a network node and request access to a physical network element 21, such as a link. A microflow is a single instance of an application-to-application flow. The microflows originate from different applications and have different requirements on QoS such as bandwidth, delay and packet loss. These requirements are signalled to, and negotiated with, an admission control function 22. Provided that link resources are available, the admission control function allocates a Service Level Specification (SLS) to a particular microflow. The Service Level Specification includes a Traffic Conditioning Specification (TCS) that specifies traffic characteristics, such as peak rate, mean rate, and maximum allowed burstiness, that the microflow must fulfill at the ingress of the network. The SLSs define different service classes or levels and the microflows are allocated SLSs that correspond to their respective QoS requirement. Flows having the same or similar QoS requirements are allocated the same SLS so that a number of aggregate traffic flows are formed. FIG. 2 shows M aggregate flows SLS1, . . . , SLSM. Traffic parameters such as mean bandwidth and burstiness are measured by means of a measurement function 26 for each aggregate flow separately. These parameters are reported to a mapping control unit 23 as feedback information. The feedback information makes the mapping control unit 23 aware of the characteristics of the actual traffic mix such as the amount of traffic of each aggregate flow and the ratio between the traffic amounts of the different aggregate flows.

The mapping control unit 23 is responsible for programming a mapping function 24 based on the received feedback information. The mapping function 24 maps the aggregate flows to N partial resources B1, . . . , BN, each having different QoS levels. The QoS level of a partial resource is determined by multiplexing rules or scheduling rules that govern how the partial resource is multiplexed onto the physical resource. Thus different partial resources may be allowed to use different portions of a total underlying physical resource. This may for instance be governed by a Round Robin scheduling mechanism or other mechanism as is well known to the person skilled in the art.

In the embodiment shown in FIG. 2, the multiplexing of the partial resources is governed by a multiplexing function 25 which may be reprogrammed under the control of the mapping control unit 23. Thus the capacity of the partial resources may be changed in response to the feedback information regarding the traffic mix that the mapping control unit receives. The mapping control unit may also receive feedback information from a measurement function 27 regarding packet delay and loss data per partial resource. Thereby the mapping control unit may detect if a partial resource is or is about to become overloaded which further assists the mapping control unit in determining the optimal mapping and multiplexing rules. The feedback information from the measurement function 27 may further give an indication about whether or not the QoS requirements per microflow are fulfilled. The delay and packet loss performance for the microflows on the network element may also be measured end to end and the result may be compared with the delay and drop rate requirements for the flows as stated in the SLSs for the microflows.

Using the above mentioned feedback information regarding traffic characteristics and resource load, as well as the comparisons of the actual QoS to the QoS requirements, the mapping control unit determines the optimal mapping and scheduling rules by means of an optimization algorithm. The optimal mapping and scheduling rules are, as mentioned above, usually considered to be the mapping and scheduling rules that minimizes the total amount of wasted resources and thereby also minimizes the utilization of the network element 21. The feedback information from the measurement functions 26 and 27 to the mapping control unit allows the system to adapt in real-time to changes in the traffic mix.

In the embodiment illustrated in FIG. 2 the characteristics of the partial resources B1, . . . , BN may be varied by means of changing the scheduling rules. Thus the mapping control unit is able to affect the resource utilization both by controlling the scheduling rules, i.e. the characteristics of the recourses, and by controlling the mapping of aggregate flows to the partial resources. Even if the scheduling rules are fixed so that the characteristics of the partial resources cannot be varied, the mapping may still be set to the mapping that is optimal in view of the available partial resources. However in a more flexible system where it is possible to adapt the partial resources it is usually possible to obtain a more efficient utilization of the total resources than in the less flexible system with fixed partial resources.

Figure 3:
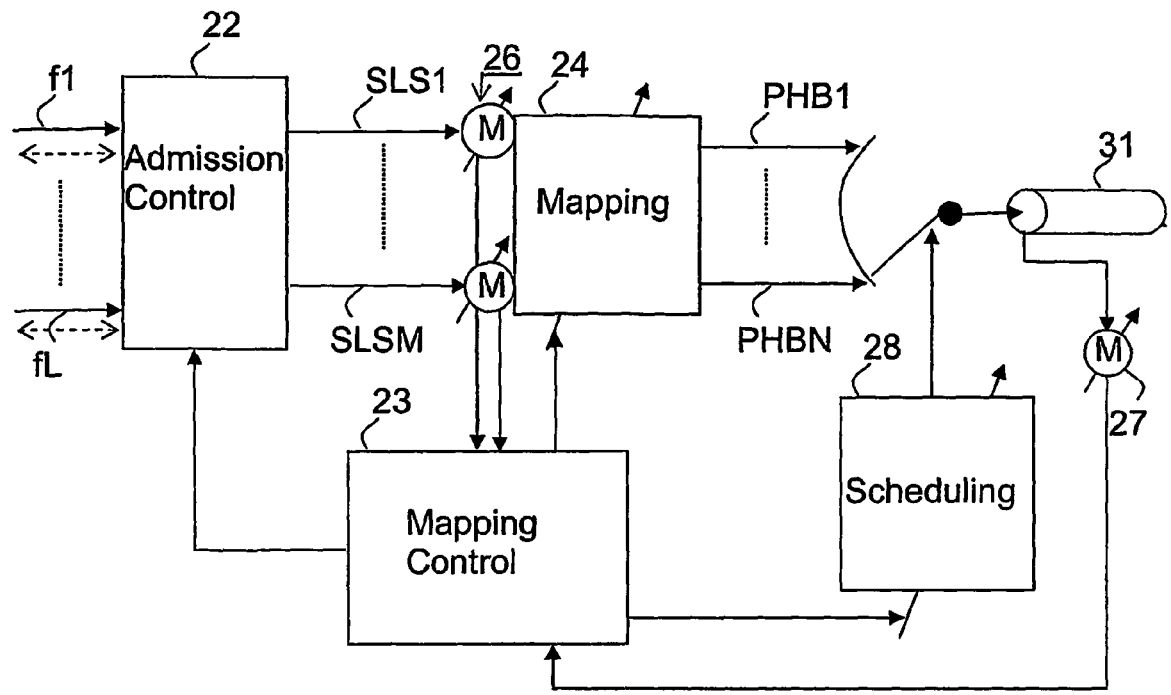
FIG. 3 is a schematic block diagram illustrating a mechanism according to the present invention for dynamic mapping between aggregate flows and per hop behaviours (PHBs) in a network using the Differentiated Services architecture.

FIG. 3 illustrates an embodiment of the present invention in an IP QoS network using the Differentiated Services QoS architecture. In this architecture, the partial resources to which aggregate flows are mapped are called per hop behaviours (PHBs). In FIG. 3 it is illustrated that the aggregate flows SLS1, . . . , SLSM are mapped to the PHBs PHB1, . . . , PHBN. A PHB is an allocated buffering and link bandwidth resource that determines the externally observable forwarding behaviour (such as forwarding delay or packet loss) of a node. In the embodiment shown in FIG. 3, the mapping control unit controls the mapping of the aggregate flows to the PHBs in response to received feedback information from the measurement functions 26 and 27. The PHBs are scheduled on a link 31 by a scheduling function 28. The scheduling function 28 is programmed by the mapping control unit so that the PHBs may be optimized to the currently received traffic mix.

Figure 4:
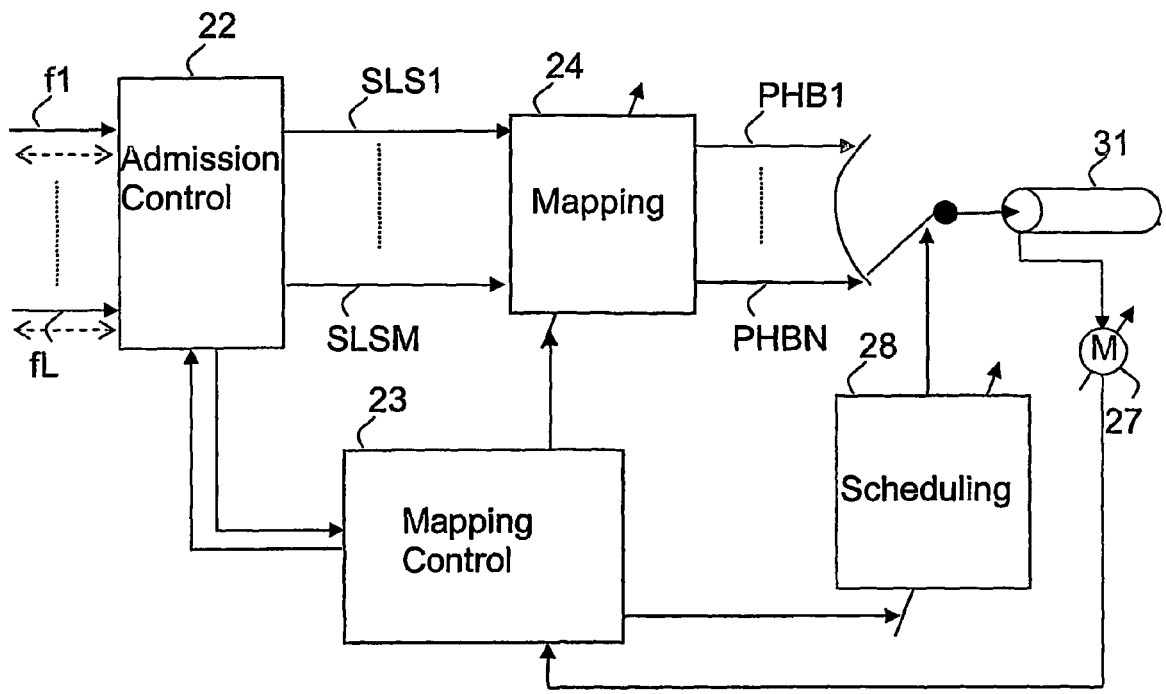
FIG. 4 is a schematic block diagram illustrating an alternative embodiment of the mechanism illustrated in FIG. 3.

In the embodiments shown in FIGS. 2 and 3 traffic parameters of the aggregate flows SLS1, . . . , SLSM are measured by the measurement function and reported to the mapping control unit. The mapping control unit is thereby provided with information regarding the traffic characteristics of the aggregate flows which is used to determine the optimal mapping in view of the traffic mix. According to an alternative embodiment, the information regarding traffic characteristics that is reported to the mapping control unit is based on calculations instead of measurements. During the set up of a microflow it may be determined that a certain microflow may not exceed certain traffic limits e.g. with respect of mean rate and peak rate. These traffic limits may be reported to the admission control function 22 by means of RSVP or ATM signalling. The admission control function 22 may then calculate corresponding traffic limits per aggregate flow based on the traffic limits of the microflows included in the respective aggregate flow. The calculated traffic limits per aggregate flow may then be reported from the admission control function 22 to the mapping control unit 23 as information regarding the traffic characteristics of the aggregate flows. According to this alternative embodiment the measurement function 26 may thus be omitted as is indicated in FIG. 4. Alternatively the measurement function 26 may be arranged such that it can receive traffic limit calculations from the admission control unit and can be set to report either measurements or received traffic limit calculations to the mapping control unit 23.

If the information regarding the traffic characteristics of the aggregate flows that is reported to the mapping control unit is based on calculated traffic limits, the mapping will probably be adapted to traffic amounts that are somewhat overestimated, since the microflows may be below set-up traffic limits but not above. It may thus likely that mappings based on measured information about the traffic mix usually are more resource-efficient than mappings based on calculated information.

To further explain the function of the system for controlling the utilization of partial resources, a concrete and simplistic example of an optimization algorithm that may be used by the mapping control unit will be explained below with reference to FIGS. 5 and 6.

Figure 5:
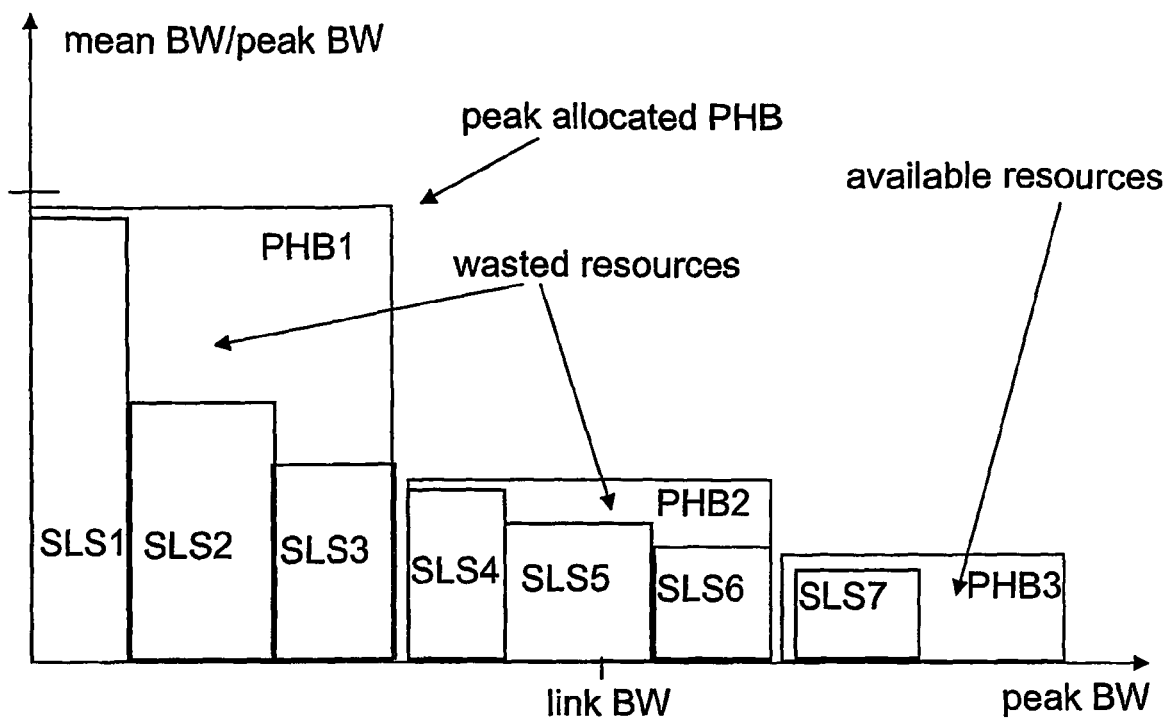
FIG. 5 is a schematic diagram illustrating a mapping of service level aggregate flows to PHBs.
Figure 6:
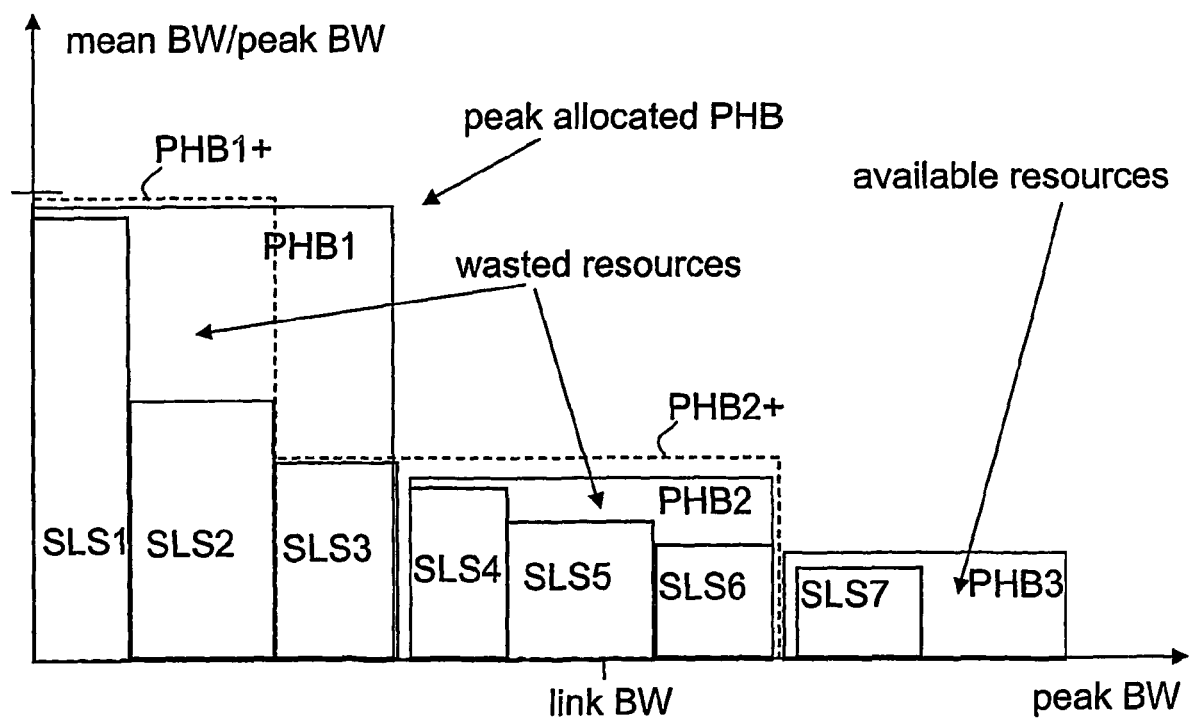
FIG. 6 is a schematic diagram illustrating how the mapping shown in FIG. 5 may be changed according to the present invention in order to provide for more efficient utilization of resources.

FIG. 5 illustrates the optimization principle for an example where seven service level aggregate flows SLS1, SLS2, . . . , SLS7 are mapped on three PHBs PHB1, PHB2, PHB3. Each PHB has underlying physical resources allocated to it in terms of two parameters: peak rate and mean rate. Likewise, each service level aggregate flow is associated with requirements on peak rate and mean rate. In FIG. 5, the peak rate is indicated on the x-axis, while the ratio between the mean rate and the peak rate is indicated on the y-axis. The mean rate is thus the area of a PHB box or aggregate flow box. In this example, all service level aggregate flows that are mapped to a specific PHB have the same time-scale of the peak rate bursts, and this time-scale is matched to the buffer size of the PHB.

If the ratio between the mean rate and peak rate is one, the PHB resources are allocated to transport the peak rate of the traffic. No packet loss or queuing delay will then occur. If the ratio is less than one, the operator has sold more peak rate service level specifications than the network can handle instantaneously. Traffic must therefore be buffered. As a result, queuing delay and even packet loss may occur.

The diagram in FIG. 5 gives an illustration of the optimization problem as a problem of packing aggregate flow boxes SLS1, . . . , SLS7 into PHB boxes PHB1, PHB2, PHB3 in the most efficient manner. When the aggregate flow boxes SLS1, . . . , SLS7 stay within the limits of a PHB box, the underlying physical resources of the PHB can support the requirements of the aggregate flows in terms of peak rate and mean rate. The area of a PHB box not covered by aggregate flow boxes indicates wasted mean rate resources.

The optimization algorithm according to an embodiment minimizes the waste of mean rate resources by moving the borders between the PHB boxes along the x-axis, and by adjusting the height of the PHB boxes so that it equals the height of the highest aggregate flow within the box. This is indicated in FIG. 6, where the boundary between the PHB1 and PHB2 boxes has been moved to the left, and the height of these two boxes have been adjusted to the highest aggregate flow within each box. The adjusted PHB boxes are labelled PHB1+ and PHB2+ in FIG. 6.

As can be seen, the waste of resources has been decreased within the PHB1+ box compared to PHB1. On the other hand, the waste of resources has increased somewhat within the PHB2+ box compared to PHB2. However, the decrease of waste is higher than the increase, resulting in a net saving of resources.

The optimization algorithm is related to the mapping function 24 and the scheduling function 28 of FIG. 3 as follows. Moving the border of a PHB box along the x-axis implies that the mapping of the aggregate flows onto PHBs are changed. This is accomplished by re-programming the mapping function 24. Moreover, the buffering and bandwidth resources of a PHB are adapted when the border of a PHB box is moved along the x- or y-axis. This is accomplished by re-programming the scheduling function 28.

For the special case with two PHB boxes, the aggregate flow boxes have equal widths and their heights represent a geometrically decreasing sequence $\{a_i\}$, the following optimization algorithm can be used for recursively updating the mapping of service level aggregate flows to the two PHB boxes:

$$(a_1 - a_{T+1})/(a_{T+1} - a_{T+2}) < (M-T-1) \Rightarrow T:=T+1$$

$$(a_1 - a_T)/(a_T - a_{T+1}) > (M-T) \Rightarrow T:=T-1$$

M is the total number of service level aggregate flows and T is the number of service level aggregate flows in the first of the two PHB boxes. The algorithm simply states the condition under which the T:th service level aggregate flow, i.e. SLST, should be moved from the first PHB to the second PHB, or the T+1:th service level aggregate flow, i.e. SLST+1, should be moved from the second PHB to the first PHB.

After a service level aggregate flow has been moved, the resources of the PHBs must be adapted accordingly. This adaptation can be calculated based on a priori knowledge of the resource requirements of the service level aggregate flows, or be based on measurements of the PHB performance in terms of delay and packet loss.

The two-dimensional optimization algorithm outlined here can be generalized to a multi-dimensional case including additional parameters to describe traffic and resources, such as various leaky bucket parameters. However, it is likely that a nice recursive algorithm that finds the global optimum does not exist for the general case.

The most straight forward approach is to calculate the amount of wasted resources for all possible, mappings of service level aggregate flows on PHBs, and pick the best. To reduce the number of combinations, the service level aggregate flows should be grouped according to their similarity in terms of resource requirements, just as in the case shown in FIG. 5.

In the above-described algorithm each service level aggregate flow is mapped on a single PHB. However according to an alternative embodiment a service level aggregate flow may be split between two or more resources, such as PHBs. Splitting a service level aggregate flow between several resources may lead to even more efficient utilization of resources in some cases. It may be particularly advantageous in cases where it, for some reason, is not allowed or possible to adapt the characteristics of the resources.

In cases where the traffic mix changes often, the above mentioned algorithm may have the effect that the mapping is changed very frequently. Moving service level aggregate flows back and forth between different PHBs several times during a short time period may have negative effects on the network performance. To overcome such negative effects an algorithm involving some kind of hysteresis may be used. A service level aggregate flow may for instance be moved from one PHB to another only when the decrease in wasted resources is above a certain limit or there may be a specified minimum period of time between two consecutive rearrangements of the mapping of service level aggregate flows to resources.

A change of the traffic mix will result in that the characteristics of the service level aggregate flows changes. In FIGS. 5 and 6 this will have the effect that the areas of the boxes SLS1, . . . , SLS7 changes. After such a change it may be advantageous to rearrange the mapping of aggregate flows to partial resources in order to achieve a more efficient utilization of total resources. Since the mapping control unit receives information regarding the currently received traffic mix it is possible to quickly detect and adapt to changes in the traffic mix. The information from the measurement function 26 or the admission control function 22 may include information regarding such traffic characteristics of the service level aggregate flows as the mean rate, peak rate and/or some other characteristic.

The information regarding the current traffic mix, which is measured or calculated and reported to the mapping control unit, may be used for other purposes than optimizing the utilization of resources. It may also be used to determine parameters for optimizing the performance of QoS mechanisms implemented in routers. There are e.g. implementations of the DiffServ architecture where it is important to configure the expected mean length of packets. If when measuring the traffic in the measurement function 26, significant changes in the mean packet length can be detected, this information could of course be used to change the DiffServ configuration parameters.

The mapping control unit is an important part. It is responsible for ascertaining that the partial resources are used in an efficient manner in accordance with the currently received traffic mix without being overloaded. Several different implementations of the mapping control unit are possible. It is for instance possible that each node of a network or QoS domain is provided with a mapping control unit, or the mapping control unit may be provided in a centralized control node that communicates with the network nodes. The mapping control unit and other functions may be implemented using any combination of hardware and software means. The mapping function 24 can be implemented to be programmable under the control of the mapping control unit. One way of implementing the programmable mapping function may be through software, but programmable hardware implementations are also possible as well as implementations of combinations of hardware and software. As mentioned above, the multiplexing function 25 or scheduling function 28 also is programmable under the control of the mapping control unit.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A system arranged to forward telecommunication traffic of a number of microflows in a quality of service enabled telecommunications network, each microflow being allocated a service level from a set of predetermined service levels to create a set of service level aggregate flows, wherein each service level is associated with a set of service requirements, the system comprising;
 a set of partial resources implemented at least through buffering, the set of partial resources being arranged to forward the traffic in the network, wherein the set of service level aggregate flows are mapped to the set of partial resources, and the buffering being accomplished at least in part through hardware means; and
 a control unit implemented as a combination of hardware processing means and software means, the control unit being arranged to:
  receive information regarding traffic characteristics of each service level aggregate flow and performance of the set of partial resources,
  dynamically update a mapping of the set of service level aggregate flows to the set of partial resources, based on said received information, to obtain an updated mapping, and
  dynamically update resource parameters governing the performance of the set of partial resources to obtain updated resource parameters,
 wherein when a service level aggregate flow is mapped to a partial resource, the service level aggregate flow is directed to the mapped partial resource,
 wherein a combination of the obtained updated mapping and updated resource parameters minimizes a total amount of wasted resources while fulfilling the service requirements of the service levels,
 wherein the wasted resources are resources not being used for transporting a given traffic mix,
 wherein the resources not being used for transporting a given traffic mix are still reserved and unavailable for transporting other traffic, and
 wherein the control unit is arranged to use a recursive optimization algorithm to minimize the total amount of wasted resources in view of the received information and the set of service requirements.

2. The system of claim 1 wherein the resource parameters include scheduling parameters governing how the set of partial resources are multiplexed on a physical link.

3. The system of claim 1 wherein the set of partial resources includes a set of DiffServ (Differentiated Services) per hop behaviors.

4. The system of claim 1 further comprising a resource performance measuring function means arranged to measure the resource performance and to report measurement results to the control unit, wherein the measurement results regarding the resource performance includes information about packet delay and packet loss of each partial resource measured by the resource performance measuring function means.

5. The system of claim 1 further comprising a traffic measuring function means arranged to measure traffic characteristics of at least one service level aggregate flow and to report measurement results to the control unit,
 wherein at least a portion of the measurement results regarding the traffic characteristics of the at least one service level aggregate flow includes information about mean rate and peak rate measured by the traffic measuring function means.

6. The system of claim 1 further comprising:
 signalling information receiving means arranged to receive signalling information concerning traffic limits set up for the microflows;
 traffic limits calculating means arranged to calculate corresponding traffic limits per service level aggregate flow based on the signalling information concerning the traffic limits per microflow; and
 traffic limits sending means arranged to send the traffic limits per service level aggregate flow to the control unit as at least a portion of the information regarding the traffic characteristics of each service level aggregate flow.

7. The system of claim 1 wherein the control unit is arranged to map each service level aggregate flow to one or several partial resources in the set of partial resources.

8. The system of claim 1 wherein the control unit is arranged to update the mapping when the received information indicates at least one traffic characteristic of at least one service level aggregate flow has changed by a predetermined amount since a last update of the mapping.

9. The system of claim 1, wherein the control unit is arranged to map at least one service level aggregate flow to two or more partial resources in the set of partial resources.

10. The system of claim 1, wherein the control unit is arranged to be dynamically adapting both of buffering capacity and bandwidth capability of at least one partial resource.

11. A method for updating a mapping of a set of service level aggregate flows to a set of partial resources for forwarding traffic in a quality of service enabled telecommunications network, the method comprising:
 receiving, by a mapping function unit, the set of service level aggregate flows, wherein each service level aggregate flow is made up of microflows allocated a same service level from a set of predetermined service levels, each service level being associated with a set of service requirements;
 obtaining, by a mapping control unit, information regarding traffic characteristics of each service level aggregate flow and performance of the set of partial resources; and
 dynamically updating, by the mapping control unit, the mapping of the set of service level aggregate flows to the set of partial resources, based on said obtained information, to obtain an updated mapping; and
 dynamically updating, by the mapping control unit, resource parameters governing the performance of the set of partial resources to obtain updated resource parameters,
 wherein when a service level aggregate flow is mapped to a partial resource, the service level aggregate flow is directed to the mapped partial resource,
 wherein a combination of the obtained updated mapping and updated resource parameters minimizes a total amount of wasted resources while fulfilling the service requirements of the service levels, wherein the wasted resources are resources not being used for transporting a given traffic mix, wherein the resources not being used for transporting a given traffic mix are still reserved and unavailable for transporting other traffic, and wherein the updating of the mapping is made using a recursive optimization algorithm to minimize the total amount of wasted resources in view of the obtained information and the set of service requirements.

12. The method of claim 11 wherein the resource parameters include scheduling parameters governing how the set of partial resources are multiplexed on a physical link.

13. The method of claim 11 wherein the step of obtaining the information includes measuring, by a measuring function unit, packet delay and packet loss of each partial resource.

14. The method of claim 11 wherein the step of obtaining the information includes measuring, by a measuring function unit, mean rate and peak rate of at least one service level aggregate flow.

15. The method of claim 11 wherein the step of obtaining the information regarding traffic characteristics of each service level aggregate flow comprises:

receiving, by an admission control unit, signalling information concerning traffic limits set up for the microflows; and calculating, by the admission control unit, corresponding traffic limits per service level aggregate flow based on the signalling information concerning traffic limits per microflow to form at least a portion of the information regarding traffic characteristics of each service level aggregate flow obtained by the mapping control unit.

16. The method of claim 11 wherein the mapping is updated where each service level aggregate flow is mapped to one or several partial resources in the set of partial resources.

17. The method of claim 11 wherein the updating of the mapping is made when the obtained information indicates at least one traffic characteristic of at least one service level aggregate flow has changed by a predetermined amount since a last update of the mapping.

18. The method of claim 11, wherein the step of dynamically updating the mapping comprises updating, by the mapping control unit, the mapping where at least one service level aggregate flow is mapped to two or more several partial resources in the set of partial resources.

19. The method of claim 11, wherein the step of dynamically updating the mapping comprises adapting both of buffering capacity and bandwidth capability of at least one partial resource.

20. A control unit implemented as combination of hardware processing means and software means for controlling a mapping of a set of service level aggregate flows of telecommunications traffic to a set of partial resources implemented at least through buffering for forwarding traffic in a network, wherein each service level aggregate flow corresponds to a service level associated with a set of service requirements, and the buffering being accomplished at least in part through hardware means, the control unit comprising:

means for receiving information regarding traffic characteristics of each service level aggregate flow and performance of the set of partial resources;

means for dynamically controlling the mapping of the set of service level aggregate flows to the set of partial resources, based on the received information, to obtain an updated mapping; and means for dynamically controlling resource parameters governing the performance of the set of partial resources to obtain an updated resource parameters, wherein when a service level aggregate flow is mapped to a partial resource, the service level aggregate flow is directed to the mapped partial resource, wherein a combination of the obtained updated mapping and updated resource parameters minimizes a total amount of wasted resources while fulfilling the service requirements of the service levels, wherein the wasted resources are resources not being used for transporting a given traffic mix, wherein the resources not being used for transporting a given traffic mix are still reserved and unavailable for transporting other traffic, and wherein the means for dynamically controlling the mapping includes one or both of computation means arranged to use a recursive optimization algorithm to update the mapping and the resource parameters for minimizing the total amount of waster resources in view of the received information and the set of service requirements.

21. The control unit of claim 20 wherein the resource parameters include scheduling parameters governing how the set of partial resources are multiplexed on a physical link.

22. The control unit of claim 20 further comprising means for sending information regarding a current mapping to an admission control unit controlling admissions of microflows into the set of service level aggregate flows.

23. The control unit of claim 20 wherein the information regarding the performance of the set of partial resources includes information about packet delay and packet loss of each partial resource.

24. The control unit of claim 20 wherein the information regarding traffic characteristics of each service level aggregate flow includes information about mean rate and peak rate.

25. The control unit of claim 20 wherein the means for dynamically controlling the mapping is arranged to control the mapping where each service level aggregate flow is mapped to one or several partial resources in the set of partial resources.

26. The control unit of claim 20 wherein the control unit is arranged to update the mapping when the received information indicates at least one traffic characteristic of at least one service level aggregate flow has changed by a predetermined amount since a last update of the mapping.

27. The control unit of claim 20, wherein the means for dynamically controlling the mapping is arranged to control the mapping at least one service level aggregate flow is mapped to two or more several partial resources in the set of partial resources.

28. The control unit of claim 20, wherein the means for dynamically controlling the mapping is arranged to be capable of dynamically adapting both of buffering capacity and bandwidth capability of at least one partial resource.

* * * * *